US010551905B1

(12) United States Patent
Hsiao et al.

(10) Patent No.: US 10,551,905 B1
(45) Date of Patent: Feb. 4, 2020

(54) DATA-TRANSMISSION-FORMAT CONVERSION CIRCUIT AND CONTROL METHOD FOR DATA-TRANSMISSION-FORMAT CONVERSIONS BETWEEN DIFFERENT HIGH-SPEED DATA TRANSMISSION INTERFACES

(71) Applicant: Realtek Semiconductor Corp., HsinChu (TW)

(72) Inventors: Cheng-Yuan Hsiao, Taichung (TW); Sung-Kao Liu, Hsinchu (TW); Yi-Ting Chien, Hsinchu County (TW); Wei-Hung Chuang, Taichung (TW); Chih-Yu Hsu, New Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/228,779

(22) Filed: Dec. 21, 2018

(30) Foreign Application Priority Data

Sep. 4, 2018 (TW) .............................. 107130952 A

(51) Int. Cl.
*G06F 1/3234* (2019.01)
*G06F 13/40* (2006.01)
(Continued)

(52) U.S. Cl.
CPC .......... *G06F 1/3278* (2013.01); *G06F 1/3253* (2013.01); *G06F 13/122* (2013.01);
(Continued)

(58) Field of Classification Search
CPC ........ G06F 1/32; G06F 1/3203; G06F 1/3206; G06F 1/3209; G06F 1/325; G06F 1/3253;
(Continued)

(56) References Cited

U.S. PATENT DOCUMENTS 9,804,824 B1 * 10/2017 Ning ......................... G06F 5/12
2009/0327774 A1 * 12/2009 Jeyaseelan ............ G06F 1/3203
713/320

(Continued)

FOREIGN PATENT DOCUMENTS

TW  I362202  4/2012
TW  I413113  10/2013

*Primary Examiner* — Thomas J. Cleary
(74) *Attorney, Agent, or Firm* — Winston Hsu

(57) ABSTRACT

A data-transmission-format conversion circuit has a first data transmission interface, a second data transmission interface, and a control circuit. The control circuit is coupled to the first data transmission interface and the second data transmission interface for processing data-format conversions between the first data transmission interface and the second data transmission interface. The control circuit is further used to control the second data transmission interface to switch from a first corresponding power mode to a second corresponding power mode when the first data transmission interface is switched from a first power mode to a second power mode. The control circuit is further used to control the second data transmission interface to switch from the first corresponding power mode to a third corresponding power mode when the first data transmission interface is switched from the first power mode to a third power mode.

16 Claims, 2 Drawing Sheets

(51) Int. Cl.
*G06F 13/12* (2006.01)
*G06F 13/42* (2006.01)

(52) U.S. Cl.
CPC ........ *G06F 13/405* (2013.01); *G06F 13/4027* (2013.01); *G06F 13/4221* (2013.01)

(58) Field of Classification Search
CPC .... G06F 1/3278; G06F 1/3287; G06F 13/122; G06F 13/4004; G06F 13/4009; G06F 13/4022; G06F 13/4027; G06F 13/4221; G06F 13/4265; G06F 13/4282; G06F 13/405
See application file for complete search history.

(56) References Cited

U.S. PATENT DOCUMENTS

| | | | |
|---|---|---|---|
| 2012/0039163 A1* | 2/2012 | Nakajima | H04L 41/0654 370/217 |
| 2013/0054866 A1* | 2/2013 | Saito | G06F 1/266 710/313 |
| 2013/0191653 A1* | 7/2013 | Shih | H01M 10/44 713/300 |
| 2016/0179738 A1* | 6/2016 | Guddeti | G06F 11/3027 714/56 |
| 2017/0185100 A1* | 6/2017 | Nguyen | G06F 1/10 |
| 2018/0024613 A1* | 1/2018 | Matsumoto | G06F 1/266 713/310 |

\* cited by examiner

DATA-TRANSMISSION-FORMAT CONVERSION CIRCUIT AND CONTROL METHOD FOR DATA-TRANSMISSION-FORMAT CONVERSIONS BETWEEN DIFFERENT HIGH-SPEED DATA TRANSMISSION INTERFACES

BACKGROUND OF THE INVENTION

1. Field of the Invention

The present invention relates to a data-transmission-format conversion circuit, and more particularly to a circuit for data-transmission-format conversions between different high-speed data transmission interfaces.

2. Description of the Prior Art

Existing high-speed data transmission interfaces (such as USB, PCIE, SATA, etc.) have relatively high power consumption as their transmission performance increases. In order to solve the problem of power consumption, these high-speed data transmission interfaces often provide different link power states, such as high-efficiency transmission mode, low-efficiency transmission mode, and single-direction transmission mode (only transmission mode (i.e., Tx only) or only receive mode (i.e., Rx only)), power saving mode without transmitting, and extreme power saving mode. In the case of a single high-speed data transmission interface, these power saving modes can effectively reduce overall power consumption. However, when a product integrates two or more high-speed data transmission interfaces, the two or more high-speed interfaces may operate in different link power states. As a result, the overall power saving efficiency is greatly reduced. For example, when data is transmitted between two different interface devices, with one in a full-power operation mode and the other in a sleep mode, the overall transmission efficiency will be seriously degraded. It will consume unnecessary power thereby wasting energy.

SUMMARY OF THE INVENTION

An embodiment of the present invention provides a data-transmission-format conversion circuit. The data-transmission-format conversion circuit comprises a first data transmission interface, a second data transmission interface and a control circuit. The first data transmission interface is coupled to a first device for transmitting data to and receiving data from the first device according to a first data-transmission-format. The second data transmission interface is coupled to a second device for transmitting data to and receiving data from the second device according to a second data-transmission-format. The control circuit is coupled to the first data transmission interface and the second data transmission interface for processing data-transmission-format conversions between the first data transmission interface and the second data transmission interface. The control circuit is further configured to control the second data transmission interface to switch from a first corresponding power mode to a second corresponding power mode when the first data transmission interface is switched from a first power mode to a second power mode. The control circuit is further configured to control the second data transmission interface to switch from the first corresponding power mode to a third corresponding power mode when the first data transmission interface is switched from the first power mode to a third power mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
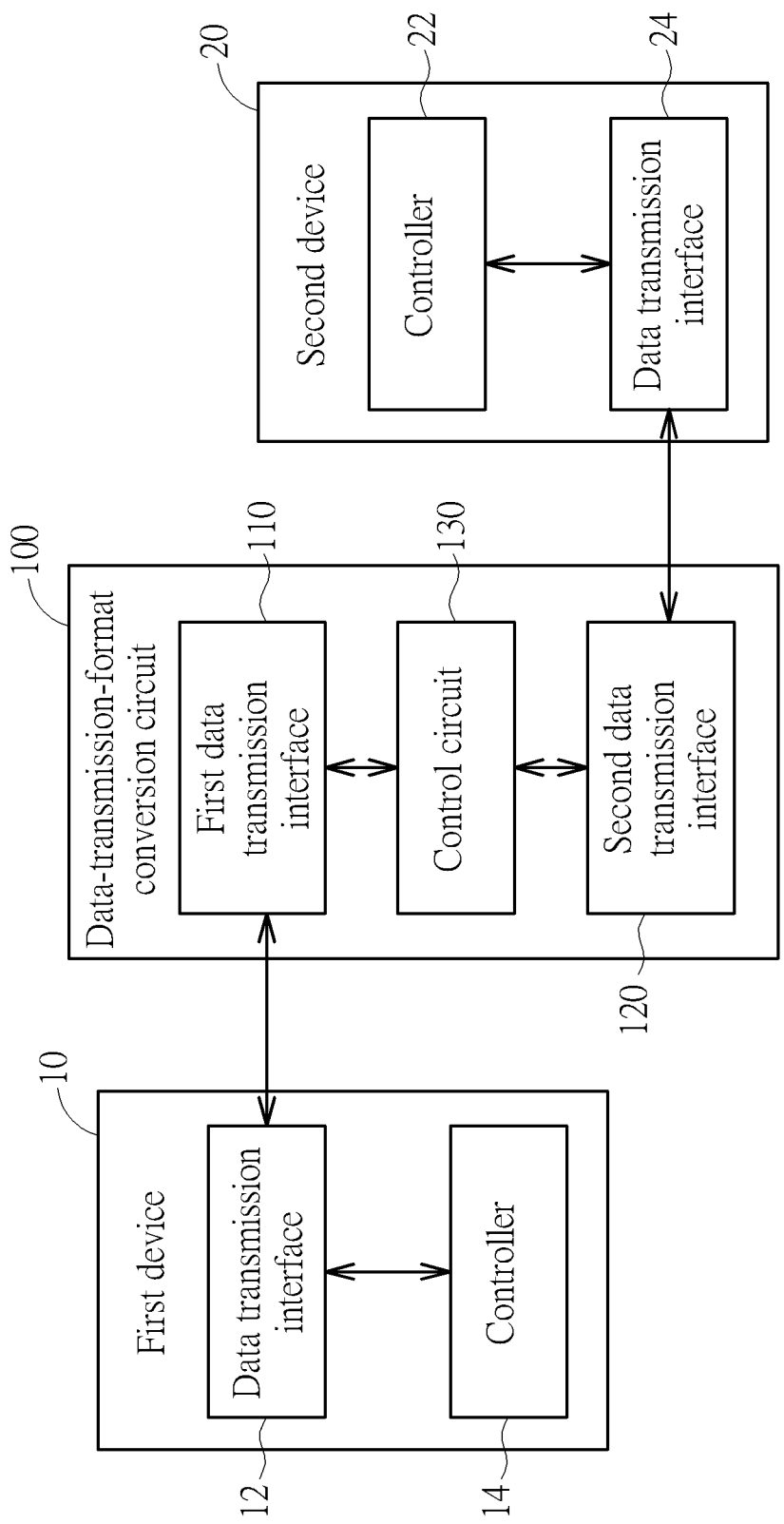
FIG. 1 is a functional block diagram of a data-transmission-format conversion circuit coupled to a first device and a second device according to an embodiment of the present invention.

Please refer to FIG. 1. FIG. 1 is a functional block diagram of a data-transmission-format conversion circuit 100 coupled to a first device 10 and a second device 20 according to an embodiment of the present invention. The first device 10 and the second device 20 are devices having two different data transmission interfaces. For example, in an embodiment of the present invention, the first device 10 may be a storage device with a serial advanced technology attachment (SATA) interface such as a hard disk having a SATA interface, and the second device 20 can be a personal computer with a universal serial bus (USB) interface. In another embodiment of the present invention, the first device 10 may be a storage device having a peripheral component interconnect express (PCIE) interface such as a solid state drive with a PCIE interface, and the second device 20 may be a notebook computer having a USB interface. Further, the first device 10 has a data transmission interface 12 and a controller 14, the second device 20 has a data transmission interface 24 and a controller 22, and the data transmission interfaces 12 and 24 are two different data transmission interfaces. The data transmission interfaces 12 and 24 may be selected from a group consisting of a USB interface, a PCIE interface, and a SATA interface. Further, the controller 14 is used to control the operations of the first device 10, and the controller 22 is used to control the operations of the second device 20.

The data-transmission-format conversion circuit 100 is coupled between the first device 10 and the second device 20, and is configured to process data-transmission-format conversions and data transmission between the first device 10 and the second device 20. The data-transmission-format conversion circuit 100 has a first data transmission interface 110, a second data transmission interface 120, and a control circuit 130. The first data transmission interface 110 is coupled to the data transmission interface 12 of the first device 10 and uses the same data transmission standard as used by the data transmission interface 12 so as to transmit data to and receive data from the first device 10 according to a first data transmission format. The second data transmission interface 120 is coupled to the data transmission interface 24 of the second device 20 and uses the same data transmission standard as used by the data transmission interface 24 so as to transmit data to and receive data from the second device 20 according to a second data transmission format. The first data transmission format and the second data transmission format are two different data transmission formats. For example, in an embodiment of the present invention, the first data transmission format may be a data transmission format conforming to the SATA interface standard (i.e., the first data transmission interface 110 and the data transmission interface 12 are SATA interfaces), and the second data transmission format may be a data transmission format conforming to the USB interface standard (i.e., the second data transmission interface 120 and the data transmission interface 24 are USB interfaces). For example, in another embodiment of the present invention, the first data transmission format may be a data transmission format conforming to the PCIE interface standard (i.e., the first data transmission interface 110 and the data transmission interface 12 are PCIE interfaces), and the second data transmission format may be a data transmission format conforming to the USB interface standard (i.e., the second data transmission interface 120 and the data transmission interface 24 are USB interfaces).

Both the first data transmission interface 110 and the second data transmission interface 120 can operate in three or more power modes or power states. For example, the first data transmission interface 110 and/or the second data transmission interface 120 may be USB 3.1 interfaces. Each USB 3.1 interface has four power modes, namely U0, U1, U2, and U3 link power states. The four link power states U0, U1, U2, and U3 have been clearly defined in the specification of universal serial bus 3.1 published on Jul. 26, 2013 and could be used as the basis and reference for implementing the embodiments of the present invention. The link power state U0 is a normal operational state, in which the devices can transmit and receive packets immediately. The link power state U1 is a standby and fast recovery state, in which the devices are in a low power consumption mode. The link power state U2 is a standby and slow recovery state, and the delay time of each device for returning to the link power state U0 from this state is greater than the delay time for returning to the link power state U0 from the link power state U1. The link power state U3 is a sleep mode, in which the power consumption of each device is less than the power consumption of other link power states U0, U1 and U2. Briefly, when the first data transmission interface 110 or the second data transmission interface 120 is a USB 3.1 interface, the power consumption in the link power states is in the order of U0>U1>U2>U3.

Further, the first data transmission interface 110 and/or the second data transmission interface 120 may be PCIE interfaces. Each PCIE interface has at least following six power modes, namely L0, L0s, L1, L2/L3 preparation (L2/L3 Ready), L2 and L3 link states, and the six link states L0, L0s, L1, L2/L3 Ready, L2 and L3 have been defined in PCI Express Base Specification Revision 1.0 disclosed on the Apr. 29, 2002 and could be used as the basis and reference for implementing the embodiments of the present invention. The link state L0 is an active state, in which each device can transmit and receive packets immediately. The link state L0s is a low recovery latency and energy saving "standby" state, in which the transmitter would transmit and the receiver would rest. The link state L1 is a higher latency, lower power "standby" state. In this state, both the transmitter and the receiver would rest, and link training is required when transmitting or receiving are performed again. The link state "L2/L3 Ready" is a staging point prepared for the link states L2 and L3. The device enters sleep mode in the link state "L2/L3 Ready". The link state L2 is an auxiliary-powered Link, deep-energy-saving state, and the link state L3 is a Link Off state, in which the device consumes no power at all.

Briefly, when the first data transmission interface 110 or the second data transmission interface 120 is a PCIE interface, the order of power consumption in the link states is: L0>L0s>L1>L2/L3 Ready>L2>L3. It should be noted that although the above PCIE interface is described by PCIE 1.0, the first data transmission interface 110 and/or the second data transmission interface 120 may be a higher version of the PCIE interface (e.g., PCIE 2.0 or PCIE 3.0). The higher version of the PCIE specification is backward compatible with the lower version of the PCIE specification.

In addition, the first data transmission interface 110 and/or the second data transmission interface 120 may be SATA interfaces. Each SATA interface has at least following three power states, namely physical layer ready (PHY READY), partial, and slumber, which are defined in the specification of SATA 1.0a published on Jan. 7, 2003 and could be used as the basis and reference for implementing the embodiments of the present invention. In the "PHY READY" power state, the physical layer logic (PHY logic) and the main phase-locked loop (main PLL) are both turned on and in an active state, and the interface is synchronized and can receive and sense data. In the partial power state, the physical layer logic is powered but in a lower power state, and two signal lines of the interface are in a neutral logic state, and the exit latency in this state does not exceed 10 microseconds (10 μs). In the slumber power state, the physical layer logic is powered but in a lower power state, while the two signal lines of the interface are in the neutral logic state, and the exit delay in this state does not exceed 10 milliseconds (10 ms). Briefly, when the first data transmission interface 110 or the second data transmission interface 120 is a SATA interface, the power consumption in each power state is in the order of PHY READY>Partial>slumber. It should be noted that although the SATA interface is described by SATA 1.0a, the first data transmission interface 110 and/or the second data transmission interface 120 may be a higher version of the SATA interface (for example, SATA 2.0 or SATA 3.0), while the higher version of the SATA specification is backward compatible with the lower version of the SATA specification.

Since the first device 10 and the second device 20 use two interfaces of different standards, when the data needs to be transmitted between the first device 10 and the second device 20, the data-transmission-format conversion circuit 100 is used to process data-transmission-format conversions between the first device 10 and the second device 20, such that the first device 10 and the second device 20 could accept the data and instructions received from each other. In addition, since the two interfaces of different standards have different power modes, the data-transmission-format conversion circuit 100 is further used to coordinate and control the first device 10 and the second device 20 to switch the power modes so as to improve overall power saving efficiency of the first device 10 and the second device 20. For example, in an embodiment of the present invention, the data transmission interface 12 of the first device 10 and the first data transmission interface 110 of the data-transmission-format conversion circuit 100 are USB 3.1 interfaces, and the data transmission interface 24 of the second device 20 and the second data transmission interface 120 of the data-transmission-format conversion circuit 100 are PCIE interfaces. In this case, the data-transmission-format conversion circuit 100 coordinates and controls the first device 10 and the second device 20 to switch the power modes according to the following table 1.

TABLE 1

| Power mode | Interface | |
| --- | --- | --- |
| | USB 3.1 | PCIE |
| Full-power operation mode | U0 | L0 |
| Normal operation mode | U1 | L0s |
| Power saving mode | U2 | L1 |
| Sleep mode | U3 | L2/L3 Ready |

In detail, in this embodiment, the data-transmission-format conversion circuit 100 divides the overall power modes into the following four power modes: "full-power operation mode", "normal operation mode", "power saving mode", and "sleep mode". By the coordination and control of the control circuit 130 of the data-transmission-format conversion circuit 100, the first device 10 and the second device 20 can be switched among the above-mentioned "full-power operation mode", "normal operation mode", "power saving mode", and "sleep mode". For example, the first device 10 and the second device 20 could be switched from "normal operation mode" to "full-power operation mode", "power saving operation mode" or "sleep mode" by the control circuit 130. Furthermore, the first device 10 and the second device 20 would be in the same power mode among the four power modes (i.e., "full-power operation mode", "normal operation mode", "power saving operation mode", and the "sleep mode") at the same time. For example, the first device 10 and the second device 20 are in the "power saving operation mode" simultaneously. In addition, when the first device 10 and the second device 20 switch to one of the power modes, the control circuit 130 switches the first data transmission interface 110 to the same power mode as the first device 10 and switches the second data transmission interface 120 to the same power mode as the second device 20. In the full-power operation mode, the data transmission interface 12 of the first device and the first data transmission interface 110 of the data-transmission-format conversion circuit 100 are both in the link power state U0 defined in the specification of USB 3.1, and the data transmission interface 24 of the second device 20 and the second data transmission interface 120 of the data-transmission-format conversion circuit 100 are both in the link state L0 defined in the specification of PCIE. In the normal operation mode, the data transmission interface 12 and the first data transmission interface 110 are in the link power state U1 defined in the specification of USB 3.1, and the data transmission interface 24 and the second data transmission interface 120 are in the link state L0s defined in the specification of PCIE. In the power saving mode, the data transmission interface 12 and the first data transmission interface 110 are both in the link power state U2 defined in the specification of USB 3.1, and the data transmission interface 24 and the second data transmission interface 120 are in the link state L1 defined in the specification of PCIE. In the sleep mode, the data transmission interface 12 and the first data transmission interface 110 are both in the link power state U3 defined in the specification of USB 3.1, and the data transmission interface 24 and the second data transmission interface 120 are in the link state "L2/L3 Ready" defined in the specification of PCIE. In addition, the power consumption in the power modes is in the order of "full-power operation mode">"normal operation mode">"power saving mode">"sleep mode". Since the data-transmission-format conversion circuit 100 binds the various power modes of the first device 10 and the second device 20 as described above, the power modes of the first device 10 and the second device are integrated effectively. Compared to the prior art, the data-transmission-format conversion circuit 100 has a better data transmission efficiency and power saving mechanism.

As described above, the switching of the power modes of the first device 10 and the second device 20 is mainly coordinated and controlled by the control circuit 130 of the data-transmission-format conversion circuit 100. With more specific detail, when the first device 10 is controlled to switch from one power mode to another power mode among the four power modes "full-power operation mode", "normal operation mode", "power saving mode" and "sleep mode", the controller 14 of the first device 10 first transmits a power mode change request to the control circuit 130 through the data transmission interface 12 and the first data transmission interface 110, so that the control circuit 130 queries, via the second data transmission interface 120 and the data transmission interface 24, the controller 22 of the second device 20 whether to agree to switch to the power mode. Thereafter, if the controller 22 agrees to switch to the power mode, the controller 22 responds to the request of the controller 14 of the first device 10 via the control circuit 130 of the data-transmission-format conversion circuit 100, thereby causing the first device 10 and the second device 20 to switch the power modes thereof simultaneously. On the other hand, if the controller 22 does not agree to switch to the power mode, the controller 22 replies to the controller 14 of the first device 10 through the control circuit 130 of the data-transmission-format conversion circuit 100 to notify the first device 10 that the power mode would not be switched, such that both the first device 10 and the second device 20 operate in the original power modes.

In another embodiment of the present invention, the data transmission interface 12 of the first device 10 and the first data transmission interface 110 of the data-transmission-format conversion circuit 100 are USB 3.1 interfaces, and the data transmission interface 24 of the second device 20 and the second data transmission interface 120 of the data-transmission-format conversion circuit 100 are SATA interfaces. In this case, the data-transmission-format conversion circuit 100 coordinates and controls the first device 10 and the second device 20 to switch the power modes according to the following table 2 to improve the overall power saving efficiency.

TABLE 2

| Power mode | Interface | |
| --- | --- | --- |
| | USB 3.1 | SATA |
| Full-power operation mode | U0 | PHY READY |
| Power saving mode | U1 | Partial |
| Sleep mode | U3 | Slumber |

With more specific detail, in the embodiment, the data-transmission-format conversion circuit 100 divides the overall power modes into the following three power modes: "full-power operation mode", "power saving mode", and "sleep mode". In the full-power operation mode, the data transmission interface 12 and the first data transmission interface 110 are in the link power state U0 defined in the specification of USB 3.1, and the data transmission interface 24 and the second data transmission interface 120 are in the power state "PHY READY" defined in the specification of SATA. In the power saving mode, the data transmission interface 12 and the first data transmission interface 110 are in the link power state U1 defined in the specification of USB 3.1, and the data transmission interface 24 and the second data transmission interface 120 are in the power state "Partial" defined in the specification of SATA. In the sleep mode, the data transmission interface 12 and the first data transmission interface 110 are in the link power state U3 defined in the specification of USB 3.1, and the data transmission interface 24 and the second data transmission interface 120 are in the power state "slumber" defined in the specification of SATA.

In another embodiment of the present invention, the data transmission interface 12 of the first device 10 and the first data transmission interface 110 of the data-transmission-format conversion circuit 100 are PCIE interfaces, and the data transmission interface 24 of the second device 20 and the second data transmission interface 120 of the data-transmission-format conversion circuit 100 are SATA interfaces. In this case, the data-transmission-format conversion circuit 100 coordinates and controls the first device 10 and the second device 20 to switch the power modes according to the following table 3 to improve the overall power saving efficiency.

TABLE 3

|  | Interface | |
| --- | --- | --- |
| Power mode | PCIE | SATA |
| Full-power operation mode | L0 | PHY READY |
| Power saving mode | L0s | Partial |
| Sleep mode | L2/L3 Ready | Slumber |

With more specific detail, in the embodiment, the data-transmission-format conversion circuit 100 divides the overall power modes into the following three power modes: "full-power operation mode", "power saving mode", and "sleep mode". In the full-power operation mode, the data transmission interface 12 and the first data transmission interface 110 are in the link state L0 defined in the specification of PCIE, and the data transmission interface 24 and the second data transmission interface 120 are in the power state "PHY READY" defined in the specification of SATA. In the power saving mode, the data transmission interface 12 and the first data transmission interface 110 are in the link state L0s defined in the specification of PCIE, and the data transmission interface 24 and the second data transmission interface 120 are in the power state "Partial" defined in the specification of SATA. In the sleep mode, the data transmission interface 12 and the first data transmission interface 110 are in the link state "L2/L3 Ready" defined in the specification of PCIE, and the data transmission interface 24 and the second data transmission interface 120 are in the power state "slumber" defined in the SATA specification.

Figure 2:
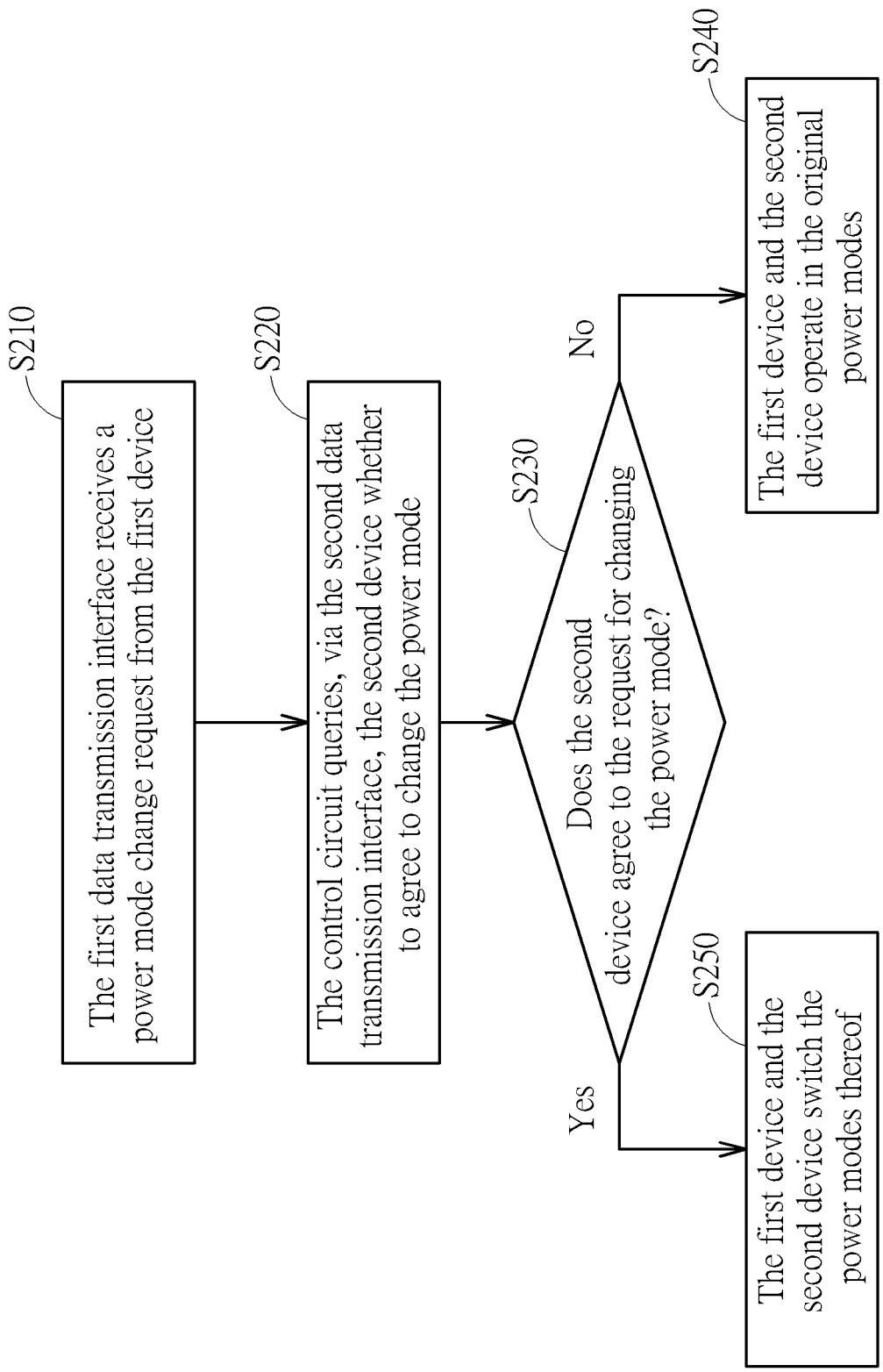
FIG. 2 is a flow chart of a method for controlling the operations of the data-transmission-format conversion circuit of FIG. 1 according to an embodiment of the present invention.

Please refer to FIG. 2. FIG. 2 is a flow chart of a method for controlling the operations of the data-transmission-format conversion circuit 100 of FIG. 1 according to an embodiment of the present invention. The foresaid method has the following steps:

Step S210: The first data transmission interface 110 of the data-transmission-format conversion circuit 100 receives the power mode change request from the first device 10;

Step S220: The control circuit 130 of the data-transmission-format conversion circuit 100 queries, via the second data transmission interface 120, the second device 20 whether to agree to the power mode change request of the first device 10;

Step S230: The second device 20 determines whether to agree to the power mode change request of the first device 10; if so, go to step S250; else, go to step S240;

Step S240: The control circuit 130 of the data-transmission-format conversion circuit 100 controls the first device 10 and the second device 20 to operate in the original power modes.

Step S250: The control circuit 130 of the data-transmission-format conversion circuit 100 controls the first device 10 and the second device 20 to switch the power modes.

In the above embodiments, the data-transmission-format conversion circuit 100 has two different data transmission interfaces, but the present invention is not limited thereto. In other embodiments of the present invention, a data-transmission-format conversion circuit of the present invention may be capable of processing data-transmission-format conversions among three or more different data transmission interfaces and capable of controlling switching of power modes of these different data transmission interfaces. For example, in an embodiment of the present invention, a data-transmission-format conversion circuit having three data transmission interfaces is disclosed. The three data transmission interfaces are a USB 3.1 interface, a PCIE interface and a SATA interface, and the three interfaces are respectively connected to a device with a corresponding interface. In this case, the data-transmission-format conversion circuit coordinates and controls the three devices, which are connected to the three data transmission interfaces of the data-transmission-format conversion circuit, to switch the power modes according to the following table 4 to improve the overall power saving efficiency.

TABLE 4

|  | Interface | | |
| --- | --- | --- | --- |
| Power mode | USB 3.1 | PCIE | SATA |
| Full-power operation mode | U0 | L0 | PHY READY |
| Power saving mode | U1 | L0s | Partial |
| Sleep mode | U3 | L2/L3 Ready | Slumber |

Briefly, the above embodiments of tables 2 and 3 are further integrated in the embodiment, and the data-transmission-format conversion circuit also divides the overall power modes into the following three power modes: "full-power operation mode", "power saving mode" and "sleep mode". With the coordination and control of the control circuit of the data-transmission-format conversion circuit of the present invention, the three devices connected to the USB 3.1 interface, the PCIE interface and the SATA interface of the data-transmission-format conversion circuit are simultaneously in the "full-power operation mode", the "power saving mode" or the "sleep mode". Before one of the three devices switches its power mode, a power mode change request is sent to other two devices through the data-transmission-format conversion circuit of the present invention. Only when other two devices agree to the power mode change request, the control circuit of the data-transmission-format conversion circuit would allow the three devices to switch their power modes. However, if one of other two devices disagrees with the power mode change request, the control circuit of the data-transmission-format conversion circuit of the present invention controls the three devices to operate in their original power modes, and no power mode switch is processed.

In summary, the data-transmission-format conversion circuits disclosed in the embodiments of the present invention integrate multiple power modes of different data transmission interfaces (e.g., USB, SATA, PCIE, etc.), such that a plurality of devices having different data transmission interfaces could switch their power modes among at least three integrated power modes (such as "full-power operation mode", "power saving mode" and "sleep mode" described above) under the coordination and control of the control circuit of the data-transmission-format conversion circuit. Since the data-transmission-format conversion circuit of the present invention binds the various power modes of different devices and effectively integrates the power modes of the devices, the data-transmission-format conversion circuit has a better data transmission efficiency and power saving mechanism as compared with the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data-transmission-format conversion circuit, comprising:
    a first data transmission interface, coupled to a first device and used for transmitting data to and receiving data from the first device according to a first protocol;
    a second data transmission interface, coupled to a second device and used for transmitting data to and receiving data from the second device according to a second protocol different from the first protocol; and
    a control circuit, coupled to the first data transmission interface and the second data transmission interface and configured to process data-transmission-format conversions between the first data transmission interface and the second data transmission interface;
    wherein the control circuit is further configured to control the second data transmission interface to switch from a first corresponding power mode of the second protocol to a second corresponding power mode of the second protocol when the first data transmission interface is switched from a first power mode of the first protocol to a second power mode of the first protocol; and
    wherein the control circuit is further configured to control the second data transmission interface to switch from the first corresponding power mode of the second protocol to a third corresponding power mode of the second protocol when the first data transmission interface is switched from the first power mode of the first protocol to a third power mode of the first protocol.

2. The data-transmission-format conversion circuit of claim 1 further comprising:
    a third data transmission interface, coupled to a third device and the control circuit for transmitting data to and receiving data from the third device according to a third protocol different from the first protocol and the second protocol;
    wherein the control circuit is further configured to process data-transmission-format conversions between the first data transmission interface, the second data transmission interface, and the third data transmission interface;
    wherein the control circuit is further configured to control the third data transmission interface to switch from a first related power mode of the third protocol to a second related power mode of the third protocol when the first data transmission interface is switched from the first power mode of the first protocol to the second power mode of the first protocol; and
    wherein the control circuit is further configured to control the third data transmission interface to switch from the first related power mode of the third protocol to a third related power mode of the third protocol when the first data transmission interface is switched from the first power mode of the first protocol to the third power mode of the first protocol.

3. The data-transmission-format conversion circuit of claim 2, wherein before the control circuit controls the second data transmission interface to switch from the first corresponding power mode to the second corresponding power mode and controls the third data transmission interface to switch from the first related power mode to the second related power mode, the control circuit queries, via the second data transmission interface, the second device whether to agree to switch to the second corresponding power mode and queries, via the third data transmission interface, the third device whether to agree to switch to the second related power mode; and
    wherein only when the second device agrees to switch to the second corresponding power mode and the third device agrees to switch to the second related power mode, the control circuit controls the second data transmission interface to switch from the first corresponding power mode to the second corresponding power mode and controls the third data transmission interface to switch from the first related power mode to the second related power mode.

4. The data-transmission-format conversion circuit of claim 1, wherein before the control circuit controls the second data transmission interface to switch from the first corresponding power mode to the second corresponding power mode, the control circuit queries, via the second data transmission interface, the second device whether to agree to switch to the second corresponding power mode; and
    wherein only when the second device agrees to switch to the second corresponding power mode, the control circuit controls the second data transmission interface to switch from the first corresponding power mode to the second corresponding power mode.

5. The data-transmission-format conversion circuit of claim 1, wherein the first data transmission interface and the second data transmission interface are selected from a group consisting of a universal serial bus (USB) interface, a peripheral component interconnect express (PCIE) interface, and a serial advanced technology attachment (SATA) interface, and the first data transmission interface is different from the second data transmission interface.

6. The data-transmission-format conversion circuit of claim 1, wherein power consumed by the first data transmission interface in the first power mode is greater than power consumed by the first data transmission interface in the second power mode and is greater than power consumed by the first data transmission interface in the third power mode; and
    wherein power consumed by the second data transmission interface in the first corresponding power mode is greater than power consumed by the second data transmission interface in the second corresponding power mode and is greater than power consumed by the second data transmission interface in the third corresponding power mode.

7. The data-transmission-format conversion circuit of claim 1, wherein power consumed by the first data transmission interface in the first power mode is less than power consumed by the first data transmission interface in the second power mode and is greater than power consumed by the first data transmission interface in the third power mode; and wherein power consumed by the second data transmission interface in the first corresponding power mode is less than power consumed by the second data transmission interface in the second corresponding power mode and is greater than power consumed by the second data transmission interface in the third corresponding power mode.

8. The data-transmission-format conversion circuit of claim 1, wherein power consumed by the first data transmission interface in the first power mode is less than power consumed by the first data transmission interface in the second power mode and is less than power consumed by the first data transmission interface in the third power mode; and
wherein power consumed by the second data transmission interface in the first corresponding power mode is less than power consumed by the second data transmission interface in the second corresponding power mode and is less than power consumed by the second data transmission interface in the third corresponding power mode.

9. A method of controlling operations of a data-transmission-format conversion circuit, the data-transmission-format conversion circuit comprising a first data transmission interface, coupled to a first device and used for transmitting data to and receiving data from the first device according to a first protocol; a second data transmission interface, coupled to a second device and used for transmitting data to and receiving data from the second device according to a second protocol different from the first protocol; and a control circuit, coupled to the first data transmission interface and the second data transmission interface for processing data-transmission-format conversions between the first data transmission interface and the second data transmission interface; the method comprising:
when the first data transmission interface is switched from a first power mode of the first protocol to a second power mode of the first protocol, the control circuit controlling the second data transmission interface to switch from a first corresponding power mode of the second protocol to a second corresponding power mode of the second protocol; and
when the first data transmission interface is switched from the first power mode of the first protocol to a third power mode of the first protocol, the control circuit controlling the second data transmission interface to switch from the first corresponding power mode of the second protocol to a third corresponding power mode of the second protocol.

10. The method of claim 9, wherein the data-transmission-format conversion circuit further comprises:
a third data transmission interface, coupled to a third device and the control circuit for transmitting data to and receiving data from the third device according to a third protocol different from the first protocol and the second protocol, wherein the control circuit is further configured to process data-transmission-format conversions between the first data transmission interface, the second data transmission interface, and the third data transmission interface; and
the method further comprises:
the control circuit further controlling the third data transmission interface to switch from a first related power mode of the third protocol to a second related power mode of the third protocol when the first data transmission interface is switched from the first power mode of the first protocol to the second power mode of the first protocol; and the control circuit further controlling the third data transmission interface to switch from the first related power mode of the third protocol to a third related power mode of the third protocol when the first data transmission interface is switched from the first power mode of the first protocol to the third power mode of the first protocol.

11. The method of claim 10 further comprising:
before the control circuit controls the second data transmission interface to switch from the first corresponding power mode to the second corresponding power mode and controls the third data transmission interface to switch from the first related power mode to the second related power mode, the control circuit querying, via the second data transmission interface, the second device whether to agree to switch to the second corresponding power mode and queries, via the third data transmission interface, the third device whether to agree to switch to the second related power mode; and
wherein only when the second device agrees to switch to the second corresponding power mode and the third device agrees to switch to the second related power mode, the control circuit controls the second data transmission interface to switch from the first corresponding power mode to the second corresponding power mode and controls the third data transmission interface to switch from the first related power mode to the second related power mode.

12. The method of claim 9 further comprising:
before the control circuit controls the second data transmission interface to switch from the first corresponding power mode to the second corresponding power mode, the control circuit querying, via the second data transmission interface, the second device whether to agree to switch to the second corresponding power mode;
wherein only when the second device agrees to switch to the second corresponding power mode, the control circuit controls the second data transmission interface to switch from the first corresponding power mode to the second corresponding power mode.

13. The method of claim 9, wherein the first data transmission interface and the second data transmission interface are selected from a group consisting of a universal serial bus (USB) interface, a peripheral component interconnect express (PCIE) interface, and a serial advanced technology attachment (SATA) interface, and the first data transmission interface is different from the second data transmission interface.

14. The method of claim 9, wherein power consumed by the first data transmission interface in the first power mode is greater than power consumed by the first data transmission interface in the second power mode and is greater than power consumed by the first data transmission interface in the third power mode; and
wherein power consumed by the second data transmission interface in the first corresponding power mode is greater than power consumed by the second data transmission interface in the second corresponding power mode and is greater than power consumed by the second data transmission interface in the third corresponding power mode.

15. The method of claim 9, wherein power consumed by the first data transmission interface in the first power mode is less than power consumed by the first data transmission interface in the second power mode and is greater than power consumed by the first data transmission interface in the third power mode; and wherein power consumed by the second data transmission interface in the first corresponding power mode is less than power consumed by the second data transmission interface in the second corresponding power mode and is greater than power consumed by the second data transmission interface in the third corresponding power mode.

16. The method of claim 9, wherein power consumed by the first data transmission interface in the first power mode is less than power consumed by the first data transmission interface in the second power mode and is less than power consumed by the first data transmission interface in the third power mode; and wherein power consumed by the second data transmission interface in the first corresponding power mode is less than power consumed by the second data transmission interface in the second corresponding power mode and is less than power consumed by the second data transmission interface in the third corresponding power mode.

* * * * *